(12) United States Patent
Ocken et al.

(10) Patent No.: US 11,919,079 B2
(45) Date of Patent: Mar. 5, 2024

(54) DISCRETE LOT POWDER MANAGEMENT FOR ADDITIVE MANUFACTURING

(71) Applicant: Delavan Inc., West Des Moines, IA (US)

(72) Inventors: Thomas J. Ocken, Des Moines, IA (US); Lukas Shea, Carlisle, IA (US); Jerry Logsdon, Van Meter, IA (US); Joseph Samo, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 188 days.

(21) Appl. No.: 17/370,682

(22) Filed: Jul. 8, 2021

(65) Prior Publication Data

US 2021/0331250 A1    Oct. 28, 2021

Related U.S. Application Data

(62) Division of application No. 15/850,330, filed on Dec. 21, 2017, now Pat. No. 11,084,099.

(51) Int. Cl.
*B33Y 40/00* (2020.01)
*B22F 3/10* (2006.01)
(Continued)

(52) U.S. Cl.
CPC ............ *B22F 3/105* (2013.01); *B22F 3/1007* (2013.01); *B22F 3/1017* (2013.01); *B22F 10/28* (2021.01);
(Continued)

(58) Field of Classification Search
CPC .......... B22F 10/28; B22F 10/73; B22F 10/34; B22F 2998/10; B33Y 10/00; B33Y 30/00; B33Y 40/00; B29C 64/357; Y02P 10/25
See application file for complete search history.

(56) References Cited

U.S. PATENT DOCUMENTS 9,718,086 B2    8/2017  Giulietti et al.
9,821,543 B1   11/2017  Crear et al.
(Continued)

FOREIGN PATENT DOCUMENTS

CN    104722759 B    1/2016
CN    205834234 U   12/2016
(Continued)

OTHER PUBLICATIONS

Extended European Search Report dated May 28, 2019, issued during the prosecution of European Patent Application No. EP 18213739.8.
(Continued)

*Primary Examiner* — John A Hevey
(74) *Attorney, Agent, or Firm* — Locke Lord LLP; Joshua L. Jones; Gabriella D'angelo

(57) ABSTRACT

A method of additive manufacturing includes supplying additive manufacturing powder to a build area of an additive manufacturing machine. The method includes fusing a portion of the powder to form a part, and removing a non-fused portion of the powder from the build area into a removable vessel for storing non-fused powder after building a part. The method can include supplying additive manufacturing powder to a build area, fusing a portion of the powder, and removing a non-fused portion of the powder all on a single discrete lot of additive manufacturing powder without mixing lots.

4 Claims, 3 Drawing Sheets

(51) Int. Cl.
*B22F 3/105* (2006.01)
*B22F 10/28* (2021.01)
*B22F 10/73* (2021.01)
*B29C 64/357* (2017.01)
*B33Y 10/00* (2015.01)
*B33Y 30/00* (2015.01)
*B22F 10/34* (2021.01)
*B22F 12/70* (2021.01)
*B29C 64/153* (2017.01)

(52) U.S. Cl.
CPC .............. *B22F 10/73* (2021.01); *B33Y 10/00* (2014.12); *B33Y 30/00* (2014.12); *B33Y 40/00* (2014.12); *B22F 10/34* (2021.01); *B22F 12/70* (2021.01); *B22F 2201/10* (2013.01); *B22F 2201/20* (2013.01); *B22F 2203/03* (2013.01); *B22F 2998/10* (2013.01); *B22F 2999/00* (2013.01); *B29C 64/153* (2017.08); *B29C 64/357* (2017.08)

(56) References Cited

U.S. PATENT DOCUMENTS

| | | | |
|---|---|---|---|
| 9,902,115 B1* | 2/2018 | Janson | ................ B29B 17/0005 |
| 2008/0182340 A1 | 7/2008 | Lemmo | |
| 2010/0192806 A1 | 8/2010 | Heugel et al. | |
| 2016/0339639 A1 | 11/2016 | Chivel | |
| 2017/0232552 A1 | 8/2017 | Crear et al. | |
| 2017/0348771 A1 | 12/2017 | Kawada et al. | |
| 2019/0126346 A1* | 5/2019 | Graichen | ................ B22F 3/003 |
| 2019/0151954 A1* | 5/2019 | Xiao | ...................... B22F 12/90 |
| 2019/0176395 A1 | 6/2019 | Roman et al. | |
| 2020/0254691 A1 | 8/2020 | Mamrak et al. | |

FOREIGN PATENT DOCUMENTS

| | | |
|---|---|---|
| EP | 2052845 A2 | 4/2009 |
| EP | 3112136 A2 | 1/2017 |
| EP | 3243620 A1 | 11/2017 |

OTHER PUBLICATIONS

Ardila L. C., et al., "Effect of IN718 Recycled Powder Reuse on Properties of Parts Manufactured by Means of Selective Laser Melting", Physics Procedia, Elsevier, Amsterdam, NL., vol. 56, Sep. 9, 2014, pp. 99-107.

\* cited by examiner

DISCRETE LOT POWDER MANAGEMENT FOR ADDITIVE MANUFACTURING

CROSS-REFERENCE TO RELATED APPLICATIONS

This is a divisional of U.S. patent application Ser. No. 15/850,330 filed Dec. 21, 2017, which is incorporated by reference herein in its entirety.

BACKGROUND OF THE INVENTION

1. Field of the Invention

The present disclosure relates to additive manufacturing, and more particularly to powder handling for additive manufacturing.

2. Description of Related Art

Some additive manufacturing machines use laser sintering to fuse metallic powder. As a part is printed or grown in a fabrication piston or build area, much of the powder in the fabrication piston or build area remains non-fused after the part is finished. Some additive manufacturing machines include onboard sieving/recycling units that collect and hold non-fused powder after a build. The sieving/recycling units then sieve the powder in the machine and return the sieved powder to the feed piston area using tubing and turbines to transport the powder so the powder can be fed to the fabrication piston or build area for manufacturing the next part. These systems are referred to as powder recycling systems, and they reduce the amount of new powder that has to be added to the system for subsequent builds. In manufacturing aerospace parts, however, the high manufacturing standards require powder lot traceability. The traditional powder recycling systems are not conducive to powder lot traceability since powder from multiple powder lots can get mixed together during the recycling process.

The conventional techniques have been considered satisfactory for their intended purpose. However, there is an ever present need for improved additive manufacturing techniques. This disclosure provides a solution for this need.

SUMMARY OF THE INVENTION

A method of additive manufacturing includes supplying additive manufacturing powder to a build area of an additive manufacturing machine. The method includes fusing a portion of the powder to form a part, and removing a non-fused portion of the powder from the build area into a removable vessel for storing non-fused powder after building a part.

The method can include supplying additive manufacturing powder to a build area, fusing a portion of the powder, and removing a non-fused portion of the powder all on a single discrete lot of additive manufacturing powder without mixing lots.

Removing a non-fused portion of the powder from the build area into a removable vessel can include transporting the non-fused portion of the powder into the removable vessel under an inert atmosphere. The inert atmosphere can include at least one of a vacuum, a noble gas, and/or nitrogen gas. The method can include sealing the non-fused portion of the powder within the vessel under the inert atmosphere. The method can include inserting a powder sampling probe into the vessel to retrieve a sample of the non-fused powder without compromising the inert atmosphere within the vessel. The method can include removing the non-fused powder from the vessel within an inert atmosphere, sieving the non-fused powder within the inert atmosphere, and returning the non-fused powder into the vessel and sealing the vessel under the inert atmosphere.

The method can include supplying the unused portion of powder from the vessel to the build area of an additive manufacturing machine, and additively manufacturing a second part exclusively from the powder from the vessel. Additively manufacturing the second part can include forming the second part entirely with powder from the vessel, wherein the vessel has a capacity of 8 gallons (30.3 Liters). The method can include heating the vessel and the non-fused powder to drive moisture and/or oxygen gas from the non-fused powder. The method can include pulling a vacuum on the removable vessel, either alone or during heating to pull off oxygen and/or moisture from the non-fused portion of the powder, and backfilling the removable vessel to ambient pressure with inert gas. The method can include rolling and/or tumbling the vessel and the non-fused powder therein to increase homogeneity in the non-fused powder. The method can include providing a means for creating and maintaining an inert atmosphere within the sealable vessel during filling of the sealable vessel during operation of the additive manufacturing machine.

A method of retrofitting an additive manufacturing machine includes disconnecting a powder sieve of a recycling system in an additive manufacturing machine and connecting and sealing a sealable vessel to the additive manufacturing machine to receive powder from the additive manufacturing machine in lieu of the sieve.

Disconnecting the powder sieve can include disconnecting the powder sieve from a powder conveyance conduit, and connecting the sealable vessel can include connecting the sealable vessel to the powder conveyance conduit. Connecting the sealable vessel can include seating the sealable vessel in a lift to support the sealable vessel without loading the powder conveyance conduit with weight from the sealable vessel.

An additive manufacturing machine includes a build area for powder fusion additive manufacturing. A powder conveyance conduit is operatively connected to the build area for conveying non-fused powder away from the build area after a build. A vessel is sealed to the powder conveyance conduit for receiving the non-fused powder.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
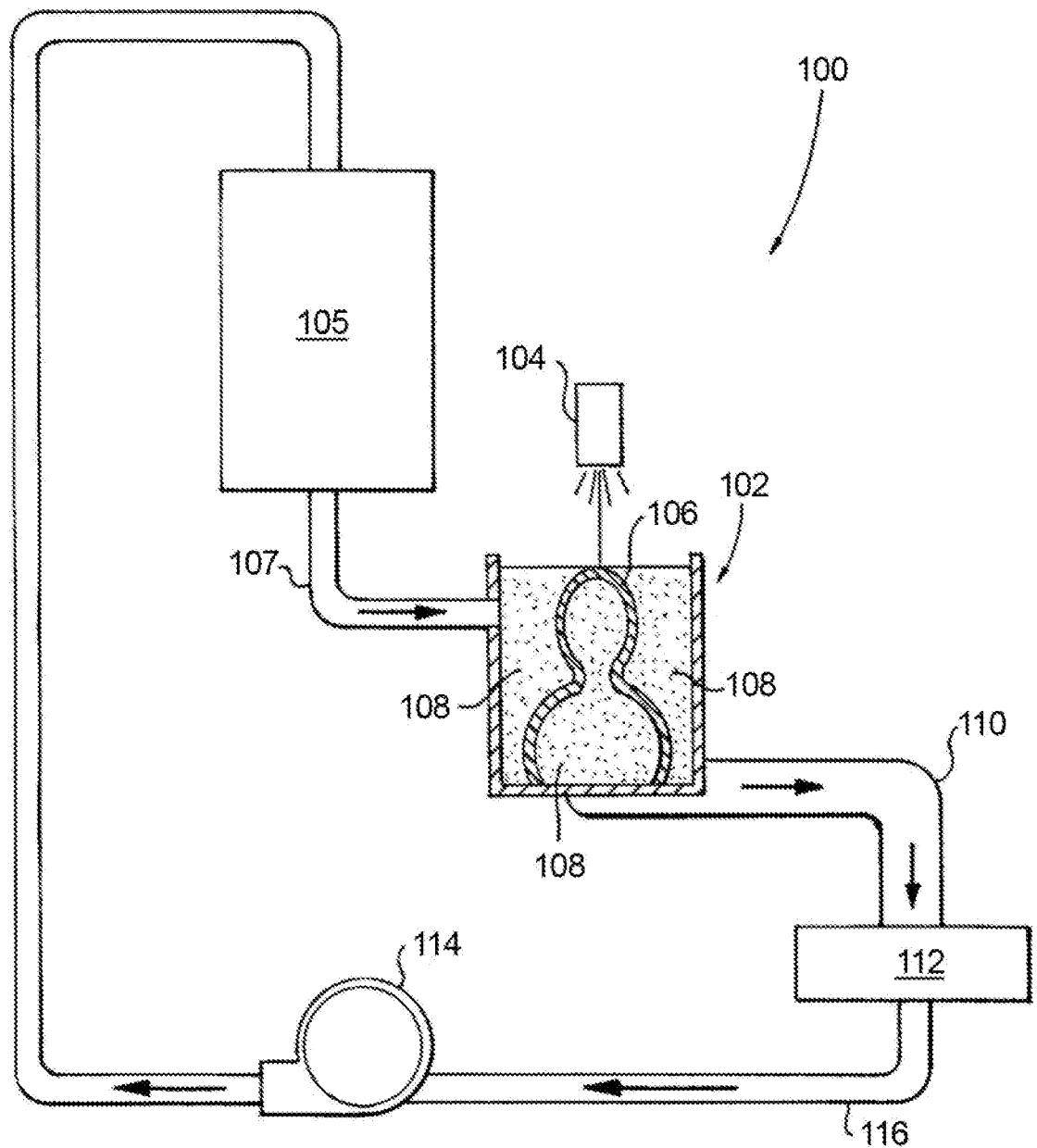
FIG. 1 is a schematic view of an exemplary embodiment of an additive manufacturing machine constructed in accordance with the present disclosure, showing the device with an operational powder recycling system.

Reference will now be made to the drawings wherein like reference numerals identify similar structural features or aspects of the subject disclosure. For purposes of explanation and illustration, and not limitation, a partial view of an exemplary embodiment of an additive manufacturing machine in accordance with the disclosure is shown in FIG. 1 and is designated generally by reference character 100. Other embodiments of additive manufacturing machines in accordance with the disclosure, or aspects thereof, are provided in FIGS. 2-3, as will be described. The systems and methods described herein can be used to provide discrete powder lot management for additive manufacturing, e.g., for ensuring aerospace standards are maintained in materials used to additively manufacture aerospace components.

The additive manufacturing machine 100 includes a build area 102 for powder fusion additive manufacturing, e.g., by laser 104 fusing powder in the build area 102 to form a part or component 106. A powder supply 105, which can be a hopper, feed piston, or the like, supplies the powder to the build area 102 through conduit 107 during the build. After the build is complete, the build area 102 contains both fused powder, which is incorporated in the component 106, as well as non-fused powder 108. A powder conveyance conduit 110 is operatively connected to the build area 102 for conveying the non-fused powder 108 away from the build area 102 after a build, as indicated by the large arrow in conduit 110 in FIG. 1. The conduit 110 conveys the non-fused powder 108 through a sieve 112 to remove any anomalous material from the non-fused powder. A turbine 114 and conveyance conduit 116 convey the sieved powder back to the powder supply 105. This configuration allows for recycling powder from one build to be used in subsequent builds, but mixes the powder from one lot with powder from other lots over time as new powder lots are added to replace the fused powder leaving the machine as completed builds.

Figure 2:
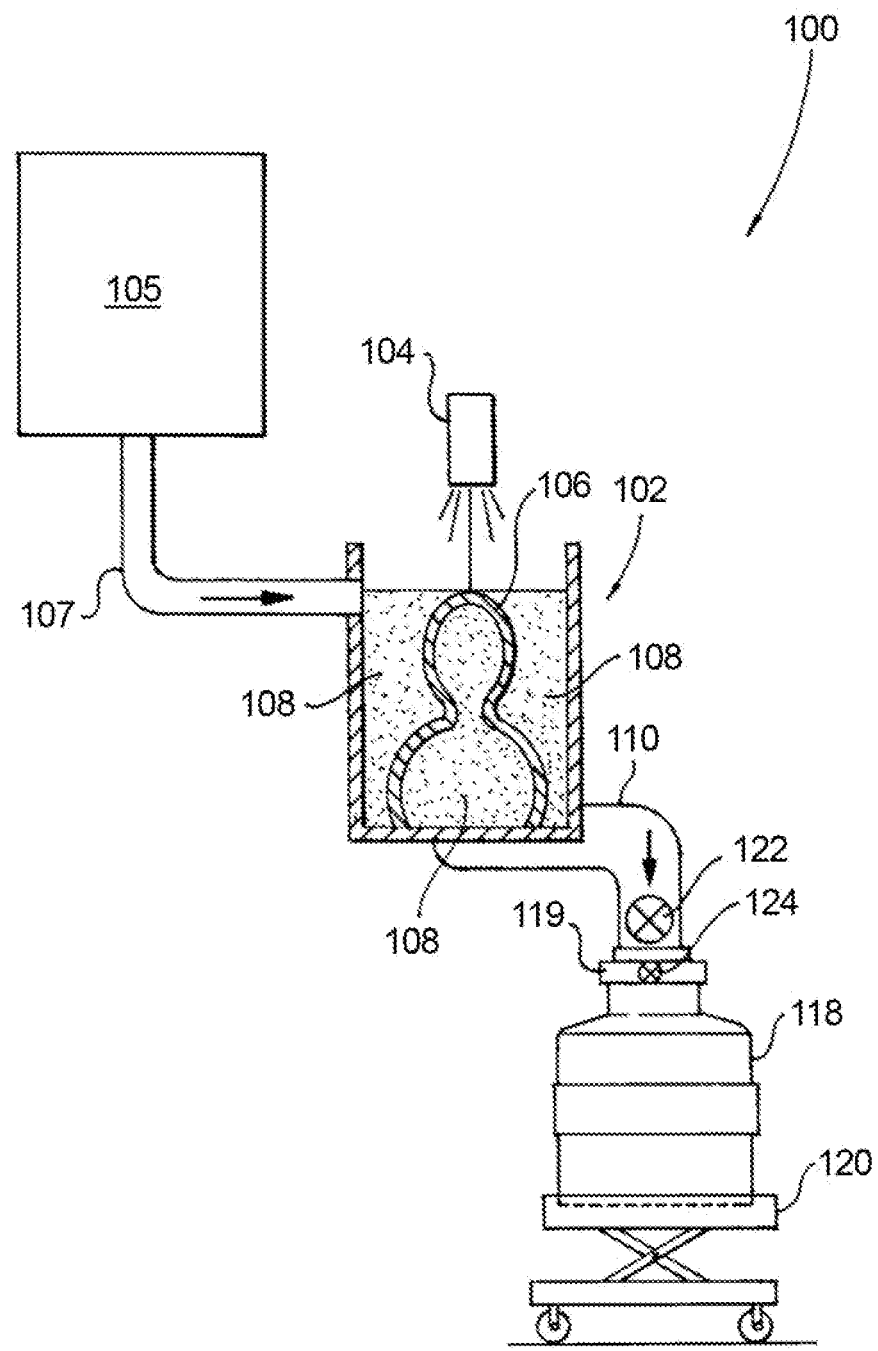
FIG. 2 is a schematic view of the additive manufacturing machine of FIG. 1, showing the machine after a retrofitting with a sealable vessel.
Figure 3:
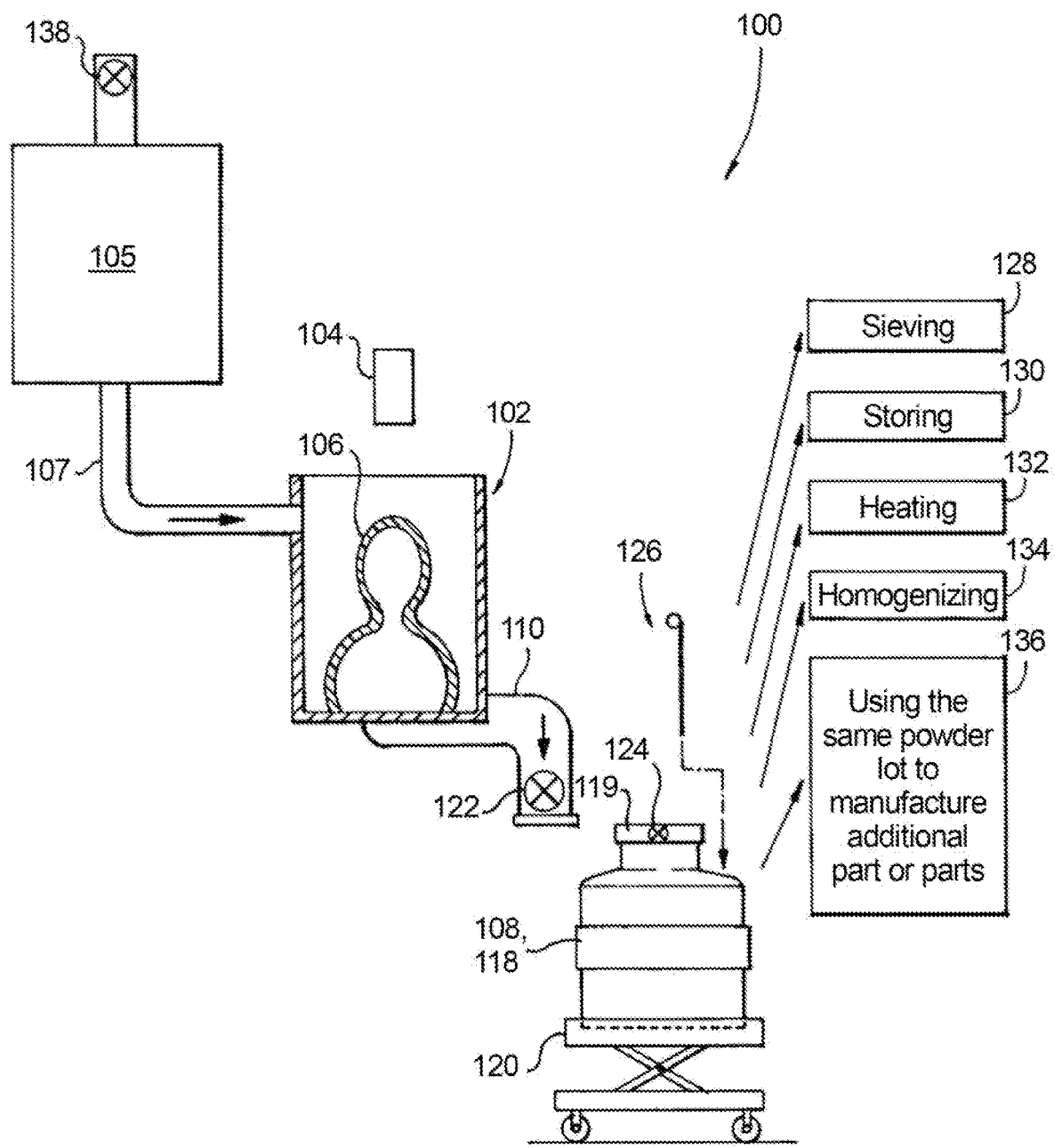
FIG. 3 is a schematic view of the machine of FIG. 1, showing the sealable vessel with non-fused powder sealed therein in an inert atmosphere.

With reference now to FIG. 2, a method of retrofitting the additive manufacturing machine 100 (e.g., starting with a ProX300 additive manufacturing machine available from 3D Systems, Inc. of Rock Hill, South Carolina) includes disconnecting the powder sieve 112 (shown in FIG. 1) of the recycling system in an additive manufacturing machine 100 and connecting and sealing a sealable, removable vessel 118 to the additive manufacturing machine 100 to receive powder from the additive manufacturing machine 100 in lieu of the sieve 112. Disconnecting the powder sieve 112 includes disconnecting the powder sieve 112 from the powder conveyance conduits 110 and 116, and connecting the sealable vessel 118 includes connecting the sealable vessel 118 to the powder conveyance conduit 110, e.g., using tri-clamp hardware 119 and valve 124. Seating the sealable vessel 118 in a rolling scissor lift 120 provides support for sealing the sealable vessel 118 to conduit 110 without loading the powder conveyance conduit 110 with weight from the sealable vessel 118 and powder therein, e.g., a combined weight of 350 lbs (158.8 kg) or more. A bladder lift or any other suitable type of lift can be issued in addition to or in lieu of scissor lift 120. A valve 122 in the conduit 110 and a valve 124 in sealable vessel 118 allow for sealing engagement and disengagement of vessel 118 with the conduit 110 without compromising the inert atmosphere within either, e.g., one or both of valves 122 and 124 can include an airlock to eliminate non-controlled atmosphere between valves 122 and 124 from entering the system when connecting the vessel 118 to the conduit 110. As shown in FIG. 2, the vessel 118 is sealed to the powder conveyance conduit 110 and the valves 122 and 124 are opened for receiving the non-fused powder into the vessel 118. As shown in FIG. 3, the valves 122 and 124 are both closed to allow removal of the vessel 118 and the non-fused powder therein from the conduit 110 without exposing the non-fused powder to an uncontrolled atmosphere.

In the configuration shown in FIG. 2, additive manufacturing can be performed with a single discrete lot of powder without mixing powder lots, and the unused or non-fused powder 108 can be saved in the vessel 118, which can be labeled for use in a subsequent build from the same single discrete powder lot. This method includes supplying additive manufacturing powder to the build area 102 from the supply 105 during a build. A portion of the powder is fused to form a part 106, and the non-fused portion of the powder is removed from the build area into a removable vessel 118 for storing the non-fused powder after building the part 106. Removing a non-fused portion 108 of the powder from the build area 102 into the removable vessel 118 includes transporting the non-fused portion of the powder into the removable vessel 118 under an inert atmosphere such as a vacuum, a noble gas, and/or nitrogen gas. The non-fused portion 108 of the powder can be sealed by valve 124 within the vessel 118 under the inert atmosphere.

As shown in FIG. 3, a powder sampling probe 126 can be inserted into the vessel 118 to retrieve a sample of the non-fused powder 108 without compromising the inert atmosphere within the vessel 118. For example, if the inert atmosphere includes a heavy noble gas like Argon, the vessel 118 can be opened from the top, the probe 126 can be inserted from above into the vessel 118, and the negative buoyancy of Argon will keep the inert atmosphere covering the powder inside vessel 118 during while the sample is taken. Once the non-fused powder 108 is sealed in the vessel 118, additional processes can be performed off-line from the machine 100. The non-fused powder 108 can be removed from the vessel 118 within an inert atmosphere, and the powder can be sieved within the inert atmosphere, as indicated by box 128 in FIG. 3. Thereafter, the sieved powder can be returned into the vessel 118 and sealed in the vessel under the inert atmosphere. The vessel 118 can be used for storage of the powder until it is needed for another build, as indicated by box 130 in FIG. 3. Moisture and/or oxygen gas can be driven from the non-fused powder by heating the vessel 118 with the powder 180 therein to a suitable temperature such as 350° F. (176.7° C.), as indicated by box 132 in FIG. 3. For example, the method can include pulling a vacuum on the removable vessel 118, either alone or during heating to pull off oxygen and/or moisture from the non-fused portion of the powder, and backfilling the removable vessel 118 to ambient pressure with inert gas. It is also contemplated that the vessel 118 and powder sealed therein can be rolled and/or tumbled to increase homogeneity in the non-fused powder 108, as indicated by box 134 in FIG. 3. The vessel 118 can be removed from the scissor lift 120 and transported as needed for storage and/or processing using a motorized lift and transport device.

As indicated by box 136 in FIG. 3, the method includes supplying the unused or non-fused portion of powder 108 from the vessel 118 to the build area of an additive manufacturing machine, e.g., by emptying the vessel 118 into supply 105 under sealed conditions by way of valves 124 and 138, and additively manufacturing a subsequent part exclusively from the powder from the vessel 118. The vessel can be large enough, e.g, 8 gallons (30.3 Liters), to hold enough powder for an entire build, e.g., where the part being built weighs 300 lbs (136.1 kg) or more when finished if nickel is used, or roughly half that weight if aluminum is used, or the appropriate weight if any other suitable metal is used.

There are many potential advantages to powder lot management systems and methods as disclosed herein. Powder lot integrity can be maintained with greater ease than in traditional systems. Collecting samples for oxidation testing and particle size distribution and morphology and satellites is facilitated relative to in traditional systems. Using the vessels disclosed herein together with scissor lifts and motorized lifts or the like allows safe and easy movement of powder by a single person. Introduction of unwanted contaminants into the powder can be avoided by keeping the powder under controlled atmospheric conditions at all times. Complications and delays related to use of recycling systems in traditional additive manufacturing machines can be eliminated because sieving can be performed off line while the machine continues the next build. This reduced maintenance and down time for the additive manufacturing machine, allowing increased production and reduced cost.

The methods and systems of the present disclosure, as described above and shown in the drawings, provide for improved powder lot management with superior properties including the ability to reuse additive manufacturing powder without mixing powder from multiple lots. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of retrofitting an additive manufacturing machine comprising:
    disconnecting a powder sieve of a recycling system in an additive manufacturing machine, wherein disconnecting includes disconnecting the powder sieve from a powder conveyance conduit; and
    connecting and sealing a sealable vessel to the additive manufacturing machine to receive powder from the additive manufacturing machine in lieu of the sieve, wherein connecting includes connecting the sealable vessel to the powder conveyance conduit in lieu of the sieve via a valve within the sealable vessel.

2. The method as recited in claim 1, wherein connecting the sealable vessel includes seating the sealable vessel in a lift to support the sealable vessel without loading the powder conveyance conduit with weight from the sealable vessel.

3. The method as recited in claim 1, further comprising providing a means for creating and maintaining an inert atmosphere within the sealable vessel during filling of the sealable vessel during operation of the additive manufacturing machine, wherein powder is sieved within the inert atmosphere.

4. The additive manufacturing machine as recited in claim 1, wherein connecting the sealable vessel to the powder conveyance conduit in lieu of the sieve further includes using tri-clamp hardware.

* * * * *